Jan. 17, 1939.   G. M. PELTZ   2,144,269
SHEAR PIN DRIVE FOR STOKERS
Filed Feb. 15, 1938

INVENTOR
GORDON M. PELTZ
BY
ATTORNEY

Patented Jan. 17, 1939

2,144,269

UNITED STATES PATENT OFFICE 2,144,269

SHEAR PIN DRIVE FOR STOKERS

Gordon M. Peltz, Portland, Oreg., assignor to Iron Fireman Manufacturing Company, Portland, Oreg.

Application February 15, 1938, Serial No. 190,604

4 Claims. (Cl. 64—28)

This invention relates generally to coal burning stokers, and particularly to a shear pin driving connection therefor.

The main object of this invention is the provision of an exceedingly simple and efficient form of shear pin driving connection which will be simple to manufacture, sturdy in construction and easy to restore to a working condition after a pin has been sheared.

The second object is to facilitate the insertion of a shear pin regardless of the relative circumferential positions in which the parts have stopped or the relative longitudinal positions of the pin holes.

The third object is to render unnecessary a realignment of the parts prior to the insertion of the shear pin.

These, and other objects, will become more apparent from the specification following as illustrated in the accompanying drawing, in which.

Similar numerals refer to similar parts throughout the several views.

Figure 1:
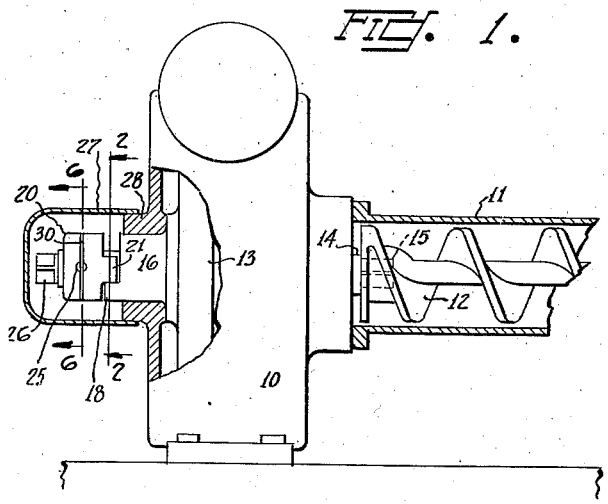
Fig. 1 is a fragmentary side elevation of a gear case showing a portion thereof as well as the worm housing broken away in cross-section.

Referring in detail to the drawing, there is shown a gear case 10 to which is attached the usual worm housing 11 which contains the fuel feeding worm 12 which is driven by a suitable reduction gearing of which the gear 13 is directly mounted on the shaft 14 whose squared end 15 projects into the end of the fuel worm 12. The gear 13 is provided with a cylindrical hub 16 from whose end 17 projects the jaw 18 whose faces 19 are substantially radial.

Also mounted on the shaft 14 is a driving collar 20 which is provided with a lug 21 whose faces 22 are substantially radial. The faces 19 are preferably less than ninety degrees apart. The same is true of the faces 22.

Through the collar 20 extends a shear pin hole 23 which is normally in register with a hole 24 in the shaft 14. The holes 23 and 24 normally contain the shear pin 25 which is made of a size and material suitable for the purpose. It is desirable to provide a squared head 26 on the end of the shaft 14 for the normal operation thereof. A shear pin cap 27 encloses the collar 20 and is frictionally held upon the hub 28 of the gear case 10. It is desirable to form a groove 29 around the collar 20 for a snap ring 30 which is employed to hold the pin 25 in position.

The operation of the device is as follows:

If a pin 25 is sheared due to an overload on the worm 12, it follows that the gear 13 can no longer drive the worm 12 since the gear 13 is now free to turn upon the shaft 14. It therefore becomes necessary to replace the sheared pin 25 with a new one. It can be seen that the sheared parts can easily be removed by slipping the collar 20 off of the end of the shaft 14 and then driving out the sheared pin parts. The collar 20 is then replaced on the shaft 14 and rotated as well as moved longitudinally until the holes 23 and 24 are in register. The new pin 25 is then inserted and the snap ring 30 is moved into place.

Figure 2:
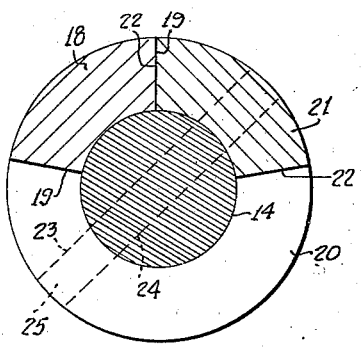
Fig. 2 is a section taken along the line 2—2 in Fig. 1.
Figure 4:
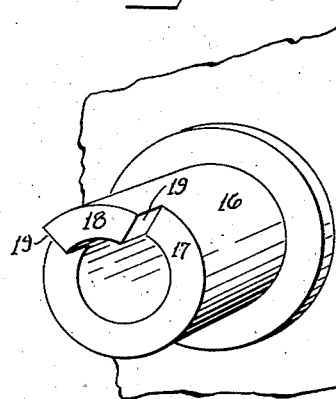
Fig. 4 is a fragmentary perspective view of a coal worm drive gear with its special hub.
Figure 3:
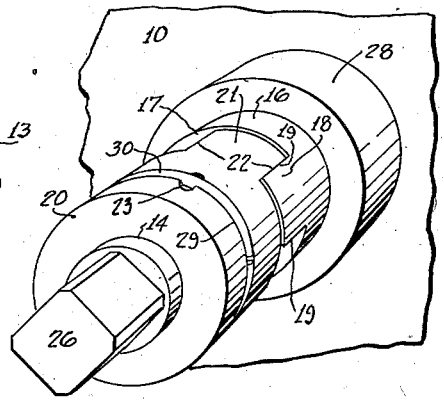
Fig. 3 is a perspective view showing the engaging position of the driving unit.
Figure 5:
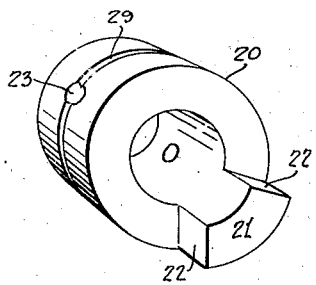
Fig. 5 is a perspective view of the driving collar.
Figure 6:
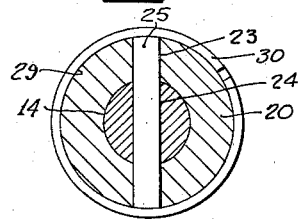
Fig. 6 is a section taken along the line 6—6 in Fig. 1.

It can be seen by an inspection of Fig. 2 of the drawing that the holes 23 and 24 may be brought into register from any position in which the parts are stopped owing to the fact that the possible relative movement between the members 18 and 21 is greater than 180°.

While I have shown the device employing a single lug 21 cooperating with a single jaw 18, it is obvious that two or more of these could be employed if a corresponding number of holes 23 are provided in order to permit the insertion of the pin 25 in any relative position which may exist between the shaft 14 and the collar 20.

It is, of course, a matter of common knowledge that shear pin drives have long been in use. It is therefore not my intention to cover such devices broadly, but I do intend to cover all such forms and modifications thereof which fall fairly within the appended claims.

I claim:

1. A drive of the class described having in combination a driven shaft, a driving gear mounted on said shaft, a driving collar secured to said driven shaft by means of a shear pin, a clutch between said driving collar and gear characterized by having more than 180° of lost motion between the jaws thereof.

2. A device of the class described consisting of a driven shaft, a drive gear mounted on said shaft, said drive gear having a laterally projecting jaw, a driving collar secured to said driven shaft by means of a shear pin, said driving collar also having a projecting jaw adapted to engage the jaw of said driving gear in a manner to form a driving connection between said gear and the driven shaft.

3. A shear pin drive mechanism for a stoker consisting of a drive gear, a drive collar associated with said gear, a shaft supporting said collar and drive gear and a single jaw clutch interposed between said collar and drive gear having a minimum of 180° of lost motion therein.

4. A drive for a coal burning stoker consisting of a driven shaft having means for coupling same to a fuel feeding worm, a drive gear rotatably mounted on said shaft, said gear having a laterally projecting jaw, a driving collar secured to said driven shaft by means of a shear pin but otherwise freely movable thereon and in circumferential and longitudinal directions, said driving collar also having a laterally projecting jaw adapted to engage the jaw on said gear when rotated with relation thereto, said collar having a groove formed around same intersecting the holes and said shear pin and a snap ring disposed within said groove.

GORDON M. PELTZ.